United States Patent
Pearce et al.

(10) Patent No.: US 10,787,936 B2
(45) Date of Patent: Sep. 29, 2020

(54) THERMODYNAMIC ENGINE

(71) Applicant: Gas Expansion Motors Limited, London (GB)

(72) Inventors: Alan Charles Pearce, Exeter (GB); Simon Few, London (GB); Natalie Adele Winter, Exeter (GB)

(73) Assignee: Gas Expansion Motors Limited, London (GB)

( * ) Notice: Subject to any disclaimer, the term of this patent is extended or adjusted under 35 U.S.C. 154(b) by 131 days.

(21) Appl. No.: 15/752,398

(22) PCT Filed: Aug. 13, 2015

(86) PCT No.: PCT/GB2015/052344
§ 371 (c)(1),
(2) Date: Feb. 13, 2018

(87) PCT Pub. No.: WO2017/025700
PCT Pub. Date: Feb. 16, 2017

(65) Prior Publication Data
US 2019/0003345 A1    Jan. 3, 2019

(51) Int. Cl.
| | |
|---|---|
| *F01K 25/06* | (2006.01) |
| *F01K 21/04* | (2006.01) |
| *F22B 1/14* | (2006.01) |
| *F22B 1/18* | (2006.01) |
| *F01B 29/10* | (2006.01) |
| *F01K 7/16* | (2006.01) |
| *F03G 6/00* | (2006.01) |

(52) U.S. Cl.
CPC .............. *F01K 25/06* (2013.01); *F01B 29/10* (2013.01); *F01K 7/16* (2013.01); *F01K 21/04* (2013.01); *F03G 6/003* (2013.01); *F22B 1/14* (2013.01); *F22B 1/1853* (2013.01)

(58) Field of Classification Search
CPC .......... F01K 25/06; F01K 21/04; F01B 29/10; F22B 1/1853
See application file for complete search history.

(56) References Cited

U.S. PATENT DOCUMENTS

| | | | |
|---|---|---|---|
| 8,667,797 B2 | 3/2014 | Woodland | |
| 2009/0038307 A1 | 2/2009 | Smith | |
| 2009/0056333 A1* | 3/2009 | Schwiegel | ............. C09K 5/045 60/671 |

(Continued)

OTHER PUBLICATIONS

International Search Report, European Patent Office, dated Apr. 15, 2016.

(Continued)

*Primary Examiner* — Shafiq Mian
(74) *Attorney, Agent, or Firm* — Bay State IP, LLC

(57) ABSTRACT

An expander of the piston (2) and cylinder (3) type is inverted from normal orientation, with the crankshaft (4) upper most and the cylinder "head" (5) lower most. The cylinder head has a pair of liquid injectors (6, 7) oriented for respective liquids pentane and glycerine to be injected as mists into contact with each other at the bottom of the cylinder. The pentane is vaporised by transfer of latent heat to it from the glycerine. Respective injector valves (9, 10) from high pressure rails (11, 12) fed by pumps (14, 15) are provided. An exhaust valve (16) is opened by a cam (17) driven at crankshaft speed by a chain drive.

13 Claims, 2 Drawing Sheets

(56) References Cited

U.S. PATENT DOCUMENTS

Figure 1:
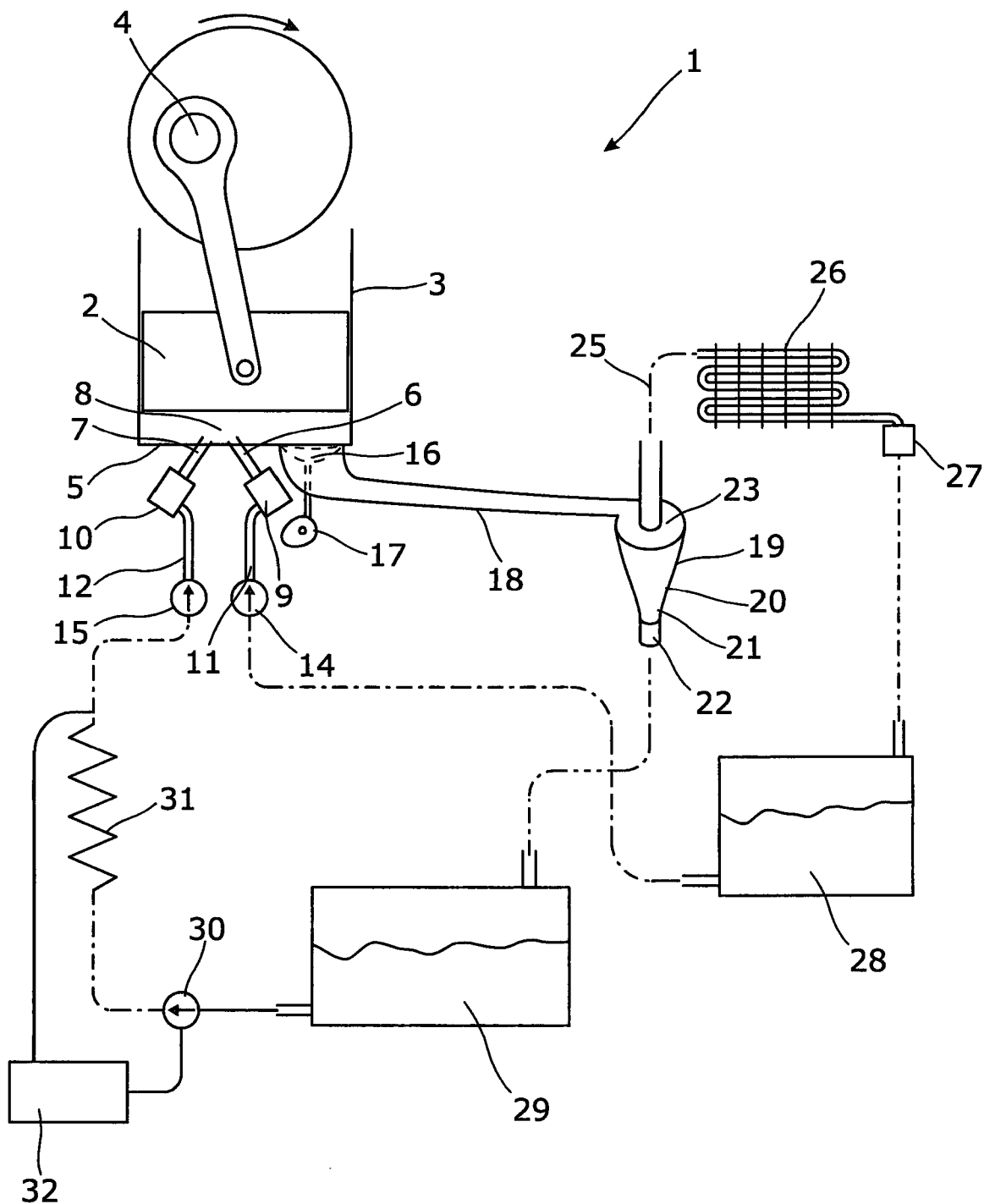

| | | | |
|---|---|---|---|
| 2009/0205336 A1* | 8/2009 | Blonn | F01K 25/06 60/649 |
| 2010/0034684 A1* | 2/2010 | Ast | F01K 21/005 418/84 |
| 2010/0287934 A1* | 11/2010 | Glynn | F01K 17/06 60/645 |
| 2011/0000205 A1* | 1/2011 | Hauer | F01K 25/065 60/511 |
| 2011/0048009 A1* | 3/2011 | Smith | F01K 7/02 60/645 |
| 2012/0006022 A1* | 1/2012 | Woodland | F01K 25/06 60/641.2 |
| 2013/0074497 A1* | 3/2013 | Mori | F01K 23/10 60/615 |
| 2013/0241204 A1* | 9/2013 | Brookman | F01K 15/02 290/52 |
| 2015/0000260 A1 | 1/2015 | Burrows | |
| 2016/0312096 A1* | 10/2016 | Bulinski | F01K 25/08 |

OTHER PUBLICATIONS

Written Opinion of International Searching Authority, European Patent Office, dated Apr. 15, 2016.

* cited by examiner

THERMODYNAMIC ENGINE

CROSS REFERENCE TO RELATED APPLICATION

This application is for entry into the U.S. National Phase under § 371 for International Application No. PCT/GB2015/052344 having an international filing date of Aug. 13, 2015.

The present invention relates to a thermodynamic engine.

Thermodynamic engines operate by expanding a gas or vapour, referred to below as "the working fluid", from an elevated pressure and temperature to a lower pressure and temperature, extracting useful work in the process. Normally this is done in a piston and cylinder engine or a turbine.

Raising the pressure and temperature can be done internally as in an internal combustion engine or externally as in a steam turbine.

Normally a single working fluid is used, albeit that in the case of internal combustion, the fluid is likely to be a mixture of gases, in particular nitrogen from air used in combustion and combustion products, principally carbon dioxide and water vapour.

It is known for liquid to pass through an engine, for instance as water in wet steam.

The present invention concerns heating the working fluid with a different fluid.

The object of the present invention is to provide an improved thermodynamic engine.

According to the invention there is provided a thermodynamic engine comprising:
  a thermodynamic expander for expanding a working fluid combined with a second fluid;
  a separator connected to an exhaust of the expander for separating second fluid from the working fluid;
  means for passing the second fluid to
    a heater therefor and thence to
    a vaporising region;
  a condenser for condensing the working fluid from gaseous form to a volatile liquid form; and
  means for passing the condensed working fluid in liquid form to the vaporising region for contact with the heated/reheated second fluid for volatising the working fluid for its work producing expansion in the expander.

The expander can be either a positive displacement device such as a reciprocating expander or a variable displacement device such as a turbine.

The vaporising region can be internal to the expander, such as the top dead centre volume of a reciprocating piston and cylinder device, analogous to the combustion chamber of an internal combustion engine, or an inlet region of a turbine.

Alternatively the vaporising region can be external to the expander, in analogous manner to a boiler of a steam engine/turbine, with the distinction that the heated/reheated second fluid is passed into the boiler with the condensed working fluid for intimate contact for heat transfer and vaporisation of the working fluid.

Normally the second fluid will be a liquid. The separator can be either on the expander side of the condenser in which case it will be a liquid/vapour separator or on the other side of the condenser, in which case it will be a liquid/liquid separator.

In the preferred embodiments, pentane is used as the phase-change medium and glycerol (propane-1,2,3-triol) with an optional admixture of propane-1,2-diol is used as the heat carrying fluid.

The second fluid can be heated in a variety of ways, such as by waste heat and by solar energy.

Figure 2:
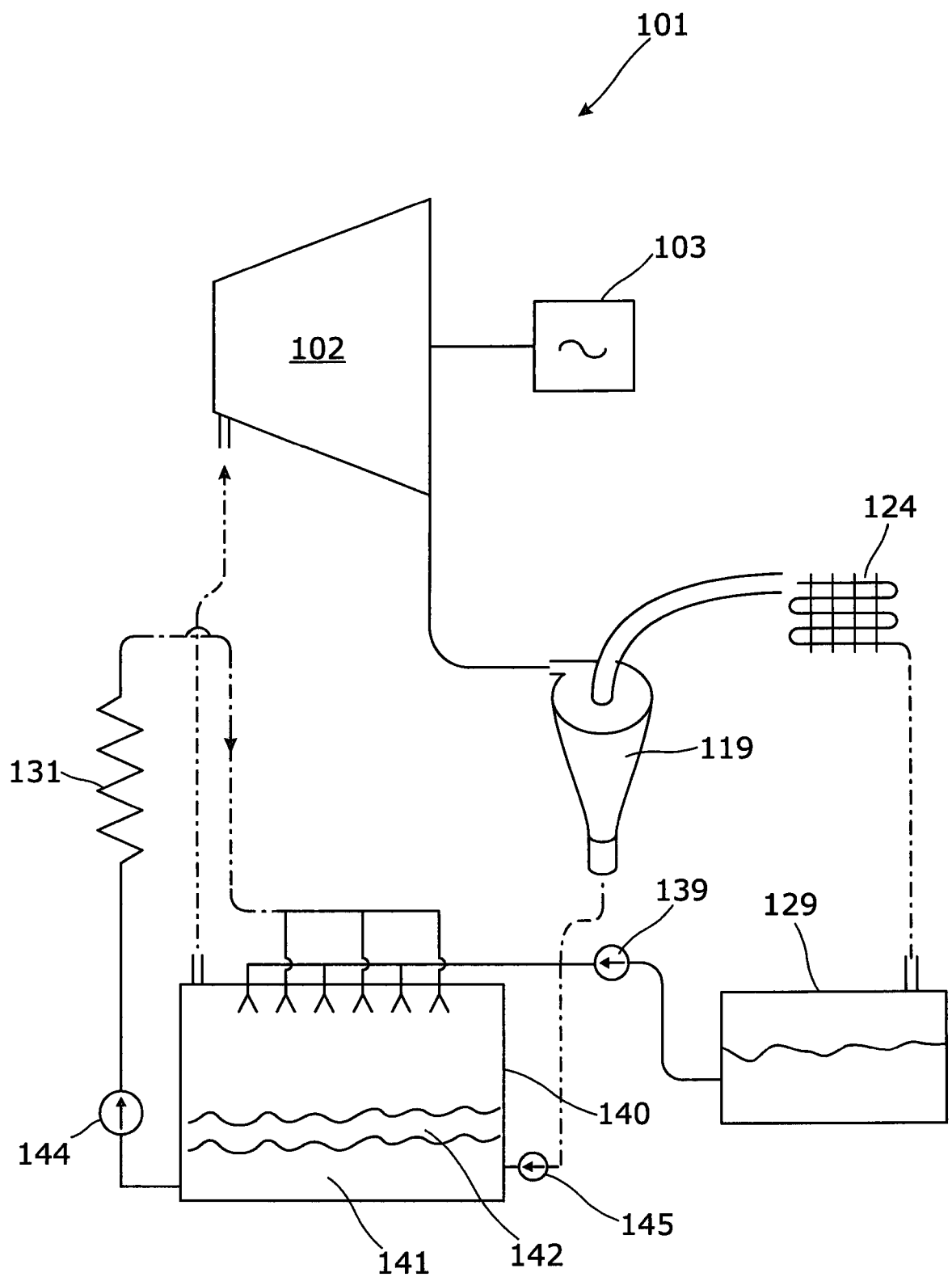

To help understanding of the invention, two specific embodiments thereof will now be described by way of example and with reference to the accompanying drawings, in which:

FIG. 1 is a block diagram of a first thermodynamic engine in accordance with the invention and FIG. 2 is a block diagram of a second thermodynamic engine in accordance with the invention Referring to FIG. 1, the thermodynamic engine 1 thereshown has an expander of the piston 2 and cylinder 3 type, inverted from normal internal combustion engine orientation, with the crankshaft 4 upper most and the cylinder "head" 5 lower most. The cylinder head has a pair of liquid injectors 6, 7 oriented for their respective liquids pentane and glycerine to be injected as mists into contact with each other at the bottom of the cylinder, into a vaporising region 8 between the "top" dead centre position of the piston and the cylinder head—the "top" dead centre position being the position of closest approach of the piston to the cylinder head and is referred to as "top" dead centre by analogy with the term in conventionally oriented engines. The pentane is vaporised by transfer of latent heat to it from the glycerine. Respective injector valves 9, 10 from high pressure rails 11, 12 fed by pumps 14, 15 are provided.

Also mounted in the cylinder head is an exhaust valve 16 opened by a cam 17 driven at crankshaft speed by a chain drive—not shown as such. An exhaust pipe 18 leads to a cyclone separator 19. In this the exhaust from the engine is caused to swirl, resulting in mist and droplets of glycerine flying out to the wall 20 of the separator and running to its bottom 21, whence it is drained periodically under control of a float valve 22. The pentane vapour is drawn off the centre 23 of the top of the separator. It should be noted that the fluid paths of the engine are closed, as opposed to open to the atmosphere, and the interior of the separator is equally closed. It will be at a pressure and temperature elevated above the ambient conditions.

Via a pipe 25, the pentane vapour is passed to a condenser 26. From the bottom of this also via a float valve 27 liquid pentane is drained. The respective liquids are piped to collect in tanks 28, 29. These have sealed lids. The pipework for the glycerine is preferably sloping down from the exhaust to the separator and then on to the glycerine tank for flow of the glycerine under gravity. It is for this reason also the expander is arranged with the cylinder head down.

From the glycerine tank, this liquid is pumped by a low pressure pump 30 to a heater 31. This may be of many types, typically a waste-heat heat-exchanger or a solar collector.

In use, the engine is likely to drive an electricity generator to generate in proportion with the available heat. A control system 32 is provided to regulate the flow of glycerine such that it leaves the heater at an appreciably elevated temperature, suitably 150° C. Flows of the hot glycerine from its tank and the liquid pentane from its tank are pumped by the injector pumps 14, 15 pressurising the liquids to injector rail pressures.

The cycle of operation for one cylinder proceeds as follows, starting from TDC: the amounts of the two media determined dynamically by the control system are injected in the appropriate time relationship to each other and to the angular position of the engine. When sufficient of both media has been injected (again calculated dynamically by the control system), injection ceases. From this point until the piston reaches the end of its stroke, the vaporised phase-change medium expands, driving the piston and delivering energy.

At the end of the stroke, the exhaust valve opens (and remains open throughout the return stroke), discharging the mixed media to the fluid-recovery part of the engine.

Referring now to FIG. 2, the thermodynamic engine 101 thereshown has a turbine 102, driving an electrical generator 103. Exhaust from the turbine passes to a separator 119, with pentane vapour passing to a condenser 124 and thence a liquid pentane tank 129. From here it is pumped by a pump 139 against elevated pressure to a boiler 140.

The boiler contains hot glycerine 141 with an overlying layer 142 of boiling pentane. The liquid pentane is sprayed onto the surface of the boiling pentane and vaporises to pentane vapour 143 in the upper part of the boiler. The glycerine is withdrawn from the bottom of the reservoir and pumped by a pump 144 to the heater 131, whence it flows back to the reservoir and is sprayed into the pentane vapour to maximise heat transfer.

The pentane vapour flows from the boiler at a rate controlled by the speed of the turbine, itself controlled by the load of the generator. This flow includes glycerine mist. It is this glycerine that is separated by the cyclone. The separated glycerine flow is returned to the boiler by a further pump 145.

It will be noted that the above described embodiments of the inventions are novel variants of the Organic Rankine Cycle which avoids the need for any heat-exchanger on the input side. Such heat exchanger is replaced by the direct injection of the hot glycerine to the pentane which performs the phase change of the Organic Rankine Cycle.

Dispersion of the heat-carrying glycerine into extremely small droplets in intimate contact with the phase-change pentane over a larger surface area than could be attained with a conventional heat exchanger, functions as an efficient and rapid mechanism of heat exchange. This obviates the considerable temperature difference and consequent loss of efficiency experienced with a conventional heat exchanger.

Since the expander cycles are completely closed, no exhaust is produced.

The invention is not intended to be restricted to the above described embodiments. For instance the reciprocating piston and cylinder expander could be a multi-cylinder device.

The invention claimed is:

1. A thermodynamic engine comprising:
   a thermodynamic expander for expanding a working fluid combined with a second fluid;
   a separator connected to an exhaust of the expander for separating second fluid from the working fluid;
   means for passing the second fluid to a heater to heat/reheat the second fluid, and then to a vaporising region;
   a condenser for condensing the working fluid from gaseous form to a volatile liquid form; and
   means for passing the condensed working fluid in liquid form to the vaporising region from a first collection tank to contact with the heated/reheated second fluid within the vaporising region to volatise the working fluid to produce work during expansion in the expander.

2. A thermodynamic engine as claimed in claim 1, wherein the expander is a positive displacement expander.

3. A thermodynamic engine as claimed in claim 1, wherein the expander is a variable displacement expander.

4. A thermodynamic engine as claimed in claim 1, wherein the vaporising region is internal to the expander.

5. A thermodynamic engine as claimed in claim 4, wherein the vaporising region is the top dead centre volume of a reciprocating piston and cylinder of the expander.

6. A thermodynamic engine as claimed in claim 5, wherein the expander is arranged with its cylinder "head" down.

7. A thermodynamic engine as claimed in claim 1, wherein the vaporising region is external to the expander.

8. A thermodynamic engine as claimed in claim 7, wherein the vaporising region is a boiler of a steam engine/turbine and the boiler is adapted for passage of the heated/reheated second fluid into the boiler with the condensed working fluid for intimate contact therewith for heat transfer and vaporisation of the working fluid.

9. A thermodynamic engine as claimed in claim 1, wherein the second fluid being a liquid, the separator is a liquid/vapour separator arranged on the expander side of the condenser.

10. A thermodynamic engine as claimed in claim 1, wherein pipework from the exhaust to the separator and from the separator to a second collection tank slopes down.

11. A thermodynamic engine as claimed in claim 1, including means for heating the second fluid by waste heat.

12. A thermodynamic engine as claimed in claim 1, including means for heating the second fluid by solar energy.

13. A thermodynamic engine as claimed in claim 1, adapted and arranged to use pentane as the phase-change medium and glycerol (propane-1,2,3-triol) with an optional admixture of propane-1,2-diol as the heat carrying fluid.

* * * * *